May 11, 1954 — H. H. ABELEW — 2,678,390
ELECTRONIC TIMING RELAY
Filed Oct. 31, 1951 — 2 Sheets-Sheet 1
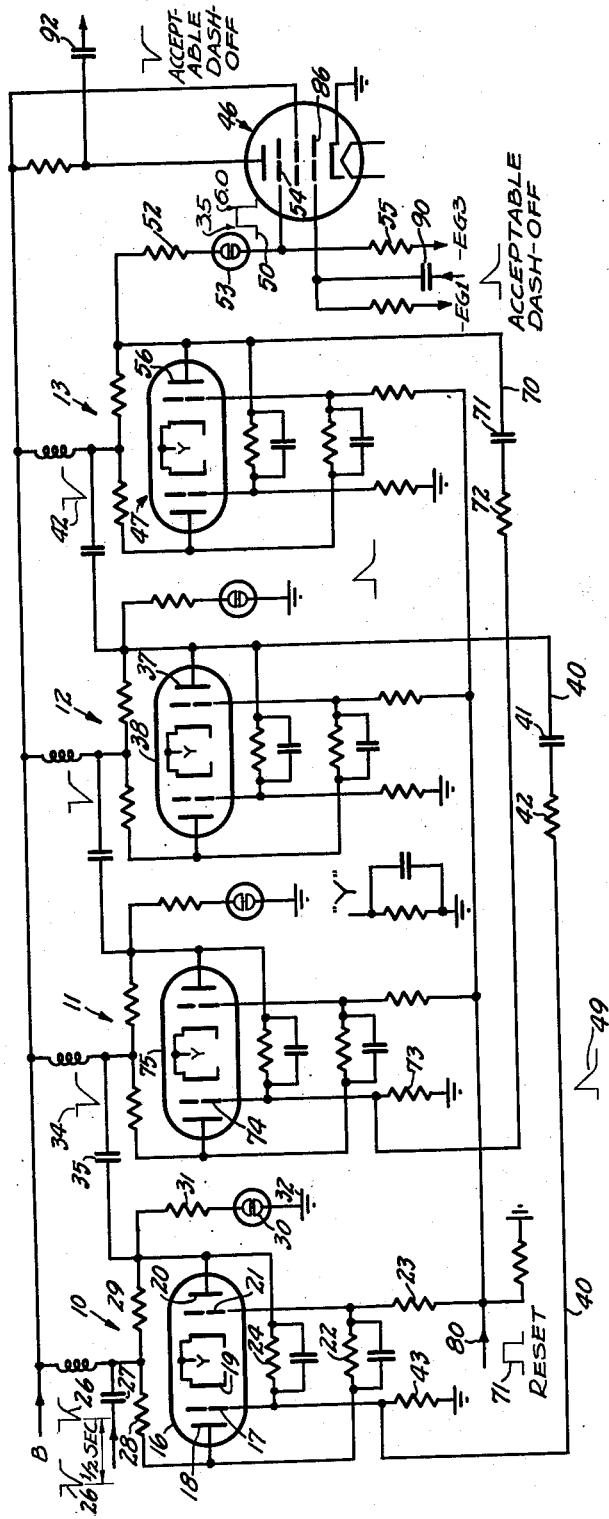
FIG. 1.
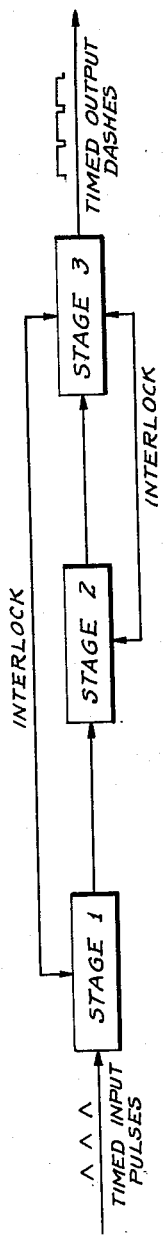
FIG. 2.
INVENTOR
*H. H. ABELEW*
BY
ATTORNEY May 11, 1954  H. H. ABELEW  2,678,390
ELECTRONIC TIMING RELAY
Filed Oct. 31, 1951                    2 Sheets-Sheet 2

FIG. 3.

*Cascaded Stages*

INTERLOCK BETWEEN 12 AND 13; 13 AND 11

|  |  | 10 | | 11 | | 12 | | 13 | |
|---|---|---|---|---|---|---|---|---|---|
|  |  | L | R | L | R | L | R | L | R |
|  |  | O | — | O | — | O | — | O | — |
| INPUT PULSE | 1 | — | O | O | — | O | — | O | — |
|  | 2 | O | — | — | O | O | — | O | — |
|  | 3 | — | O | — | O | O | — | O | — |
| START | 4 | O | — | O | — | — | O | O | — |
| END | 4 | — | O | O | — | — | O | O | — |
|  | 5 | O | — | — | O | — | O | O | — |
|  | 6 | — | O | — | O | — | O | O | — |
| START | 7 | O | — | O | — | O | — | — | O |
| END | 7 | O | — | — | O | O | — | — | O |
|  | 8 | — | O | — | O | O | — | — | O |
| START | 9 | O | — | O | — | — | O | — | O |
| END | 9 | — | O | O | — | — | O | — | O |
|  | 10 | O | — | — | O | — | O | — | O |
|  | 11 | — | O | — | O | — | O | — | O |
| RECYCLES | 12 | O | — | O | — | O | — | O | — |
| REPEATS | 13 | | | SAME AS STAGE 1 ABOVE | | | | | |

(Row 12 note: SAME AS RESET STAGE ABOVE)

— INDICATES CONDUCTING STATE

O INDICATES NON-CONDUCTING STATE

INVENTOR
*H. H. ABELEW*
BY
ATTORNEY

Patented May 11, 1954

2,678,390

UNITED STATES PATENT OFFICE 2,678,390

ELECTRONIC TIMING RELAY

Harry Hugo Abelew, Brooklyn, N. Y., assignor to Mackay Radio and Telegraph Company, New York, N. Y., a company of Delaware Application October 31, 1951, Serial No. 254,122

11 Claims. (Cl. 250—27)

This invention relates to improvements in electronic timer relays of the type employing circuits operable by a sequence of electrical timing pulses.

The primary object of the invention resides in the provision of an electronic timing device adapted to initiate an output signal in response to a predetermined number of input pulses, and to terminate said output signal in response to a predetermined number of subsequently applied input pulses.

A still further object of the invention is to provide an improved timing device adapted to provide two or more output signals in response, respectively, to a predetermined number of input pulses, and not necessarily even numbers, and thereby establish a time ratio between said output signals.

A further object is to utilize the principles of interlock in cascaded binary circuits in a manner to permit flexibility of use thereof in timing devices.

Another object is to provide an improved timing circuit responsive to a plurality of uniformly timed input pulses of any frequency for the initiation of plural output signals, having established therebetween a predetermined time relation.

Still another object of the invention is to provide improved utilization of output signals initiated by an electronic timing relay of the binary type.

Other objects and advantages are generally to improve and simplify ratio type timer circuits for one or more of the objects above stated, and particularly in respect to the establishment of a time ratio between input pulse initiated output signals.

Other advantages and modifications of the circuitry shown for explanatory purposes will become readily apparent to persons skilled in the art upon examination of the drawings, the specification, and the claims appended thereto.

In the drawings, in which like parts are identified by the same reference numerals, Fig. 1 is a schematic diagram of an electronic timing relay incorporating the principles of the present invention therein.

Fig. 2 illustrates in block a timing relay adapted to render a square wave output pulse of four second duration with intervening spaces of one second.

Fig. 3 shows in chart form the inter-stage functioning of the device in response to a sequence of applied input pulses.

Referring to Fig. 1, the apparatus includes generally, four individual multi-vibrator circuits generically designated 10, 11, 12 and 13 of a known type, and each including a double triode type of electron tube. The individual multivibrator circuits are of a conventional type, the operation of which is too well known to warrant more than the brief explanation below. For purposes of convenience of description, each multivibrator circuit will be referred to as including both right and left hand sides which refers, of course, to the triode elements and associated circuitry on each side of the double triode tubes shown. While the device is a ratio timer, and not simply an electronic counter, it will be recognized that the circuitry resembles to some extent that of counters of the type disclosed in U. S. Patents 2,521,788 to I. E. Grosdoff and 2,133,522 to J. T. Potter; and in articles entitled "New vacuum tube scaling circuits of arbitrary integral or fractional scaling ratio" by Lifschutz, Physical Review, 1940; and "A triode vacuum tube scale-of-two circuits" by Lifschutz and Lawson, Review of Scientific Instruments, 1938, vol. 9, page 83.

A brief description of the operation of one of the multi-vibratory stages is included below as an aid to understanding the inventive concept, it being understood, as stated above, that each of the stages operates in a like manner in response to negative input pulses and that no novelty per se resides in the circuitry of individual stages, but rather in the manner of interlocking stages for purposes above stated. Assuming that all stages are operating with the right sides of double triode tubes conducting, the bias on grid 21 of tube 16, stage 10, is sufficiently positive to allow current flow between anode 20 and cathode 19, substantially lowering the potential at anode 20 in respect to the potential at anode 18, of the non-conducting side of the tube.

The circuit of Fig. 1 has been simplified to the extent that the cathodes of tubes 10 through 14 show short connector leads identified by the letter Y. Each said lead is connected to ground through an individual R. C. network, one such network being illustrated intermediate and below stages 11 and 12 and also identified by the letter Y. Since grid 17 obtains its bias through a voltage divider comprising resistors 24 and 43 from anode 20, the bias thereof is relatively negative in respect to the potential of the cathode 19 to maintain the left side of the tube in a cut-off condition.

Assume that in the condition above stated, one of a sequence of negative pulses, as indicated at 26, from an oscillator-pulser or other suitable source, not shown, is introduced through condenser 27 to a mid-point between resistors 28 and 29 series connected between anodes 18 and 20 of tube 16. Pulse 26 instantaneously lowers the potential of both anodes 18 and 20, and both grids 17 and 21. Lowering the potential of grid 17 results in increasing the potential of anode 18. Since the increase of anode potential is greater than the decrease of grid potential, due to amplification by the tube, the potential of grid 17 does, in fact, undergo a net increase in positive potential, due to direct coupling from anode 20 through the voltage divider systems, resistors 24 and 43. A regenerative action, therefore, occurs with a drop in bias on grid 21 resulting in decreased conduction in the right half of the tube and consequent rise of potential on anode 20, resulting from increased positive bias of grid 17, hence increased conduction in the left half of the tube. The regenerative action continues until conduction terminates in the right half of the tube and becomes maximum in the left half in a manner well known in the art. An indicator lamp 30 is connected between anode 20, in series with resistor 31, and ground 32 for the purpose of indicating a conductive condition in the right side of the tube, lamp 30 normally consisting of a neon bulb.

As it is apparent, subsequent initiation of conduction in the right half of the tube in response to a second input pulse results in a drop in anode potential, and in a step pulse, not shown, led through differentiating condenser 35 to result in negative peak pulse, indicated at 34, and fed to the second stage 11 in the same manner that negative pulse 26 was fed to the first stage, and with the same effect thereon. Each stage is coupled, as shown, to a subsequent stage to permit trigger action therebetween in a manner which has heretofore been employed in cascaded binary stages. Stages 10, 11 and 12 and the coupling therebetween may be considered conventional, however, anode 37 of the right hand side of double triode tube 38 of stage 12, is coupled by lead 40, through blocking condenser 41 and a voltage dividing network comprising resistors 42 and 43 to the grid 17 of the first stage tube 16.

The operation of the circuit so far described is as follows: Assuming a conductive condition in the right sides of all tubes prior to triggering by input pulses, the first input pulse 26 triggers stage 10 to effect reversal of conduction, the right hand side now non-conducting, with a resultant rise of anode voltage, hence no negative output signal is fed therefrom to stage 11. The second input pulse again reverses stage 10 and resulting conduction in the right side produces a pulse of a type which when differentiated by condenser 35 is of a negative peaked character as shown at 34 to effect triggering of stage 11 from its normal state to a reversed state with the left hand side then conducting. A third input pulse reverses conduction of stage 10 with no resulting negative output pulse of the type shown at 34, hence has no effect on stage 11. The fourth input pulse again reverses conduction of stage 10 with a resultant reversal as above explained of stage 11 to return that stage to its initial state of conduction with a negative triggering pulse fed to stage 12 for reversal thereof, with no change in stage 13.

Heretofore, coupling between stage 12 and stage 10 through lead 40 had no effect on the operation of the cascaded stages, but with the reversal of conduction in stage 12 in response to the fourth applied input pulse, the potential of anode 37 of tube 38, raised upon termination of conduction in the right side, transmits a step pulse over lead 40, differentiated by condenser 41 to a positive peak pulse as indicated at 49, to grid 17 of tube 16 for reversal of the conductive state previously established therein by the fourth input pulse. For reasons stated above, stage 11 is not triggered in response to this reversal of stage 10. Stage 10 has, however, been returned to a condition to permit a reversal thereof in response to a fifth pulse to produce a negative output pulse for triggering of stage 11, stage 11 being in a state of conduction whereby the resultant triggering thereof does not produce a negative output pulse for triggering of stage 12. The sixth pulse reverses stage 10 with no resultant negative triggering pulse, being fed to stage 11. The various stages of the circuit are, however, now in a condition for simultaneous reversal, in response to the seventh input pulse, of stages 10, 11 and 12, the reversal of stage 12 resulting, unlike the reversal of that stage in response to the fourth pulse, in a negative rather than a positive output pulse 42, for initial triggering of stage 13 from a state of right to left hand conduction.

The resultant step pulse from anode 56 ionizes neon lamp 53 allowing conduction through a voltage divided network comprising resistors 52 and 55, resistor 55 being connected to a source of negative potential, not shown, to maintain control grid 54 of tube 46 at a proper negative potential during periods of non-conduction of neon lamp 53, to maintain tube 46 in a gate closed position. However, the positive potential applied to grid 54 during periods of conduction of neon tube 53 in response to the rise of potential in the circuit of anode 56 is of sufficient value to overcome the bias of grid 54 thereby swinging tube 46 to a gate open state. Concurrently, with the opening of gate tube 46, the positive pulse from anode 56 is returned through lead 70 and differentiated by condenser 71, and voltage divider network including resistors 72 and 73, to grid 74 of tube 75, stage 11, thereby reversing the conductive state of stage 11 from right to a left hand conduction. While such reversal does not trigger stage 12, the stages of the circuit are thereby arranged as to the relative conductive states thereof, to effect, in a manner described below, the closing of gate tube 46 in response to a sequence of five additional input pulses, namely the eighth through twelfth total input pulses.

The operation of the circuit in response to the last five pulses is as follows: The eighth pulse reverses the conductive state of stage 10, as do all input pulses, but does not trigger stage 11. However, the ninth input pulse triggers stages 10, 11 and 12. Reversal of stage 12 by the ninth input pulse functions in the manner as does the fourth input pulse to render stages 10, 11 and 12 to the condition previously described. It must be remembered, however, that whereas stage 13 was in one of its two bi-stable states upon application of the fourth pulse, it has been previously triggered by the seventh input pulse, to the opposite bi-stable condition, but since no stage is triggerable by positive input pulses, as distinguished from positive peak pulses fed by the interlocks directly to the grids of the tubes, the positive step wave output from stage 12 in response to the ninth input pulse does not change the state of stage 13. The ninth pulse returns stages 10, 11 and 12 to the same relative condition as did the fourth pulse, hence the tenth and eleventh pulses effect these stages exactly as did the fifth and sixth pulses above described. Application of the twelfth pulse results, in a manner described in connection with the effect of the seventh pulse, in triggering all stages 10, 11, 12 and 13, but since stage 13 is now in a state of left hand conduction, the resulting triggering pulse from stage 12 reverses stage 13 for establishment of conduction in the right side, with a resulting negative step output which extinguishes neon lamp 53 and permits the negative bias from source —EG3 to swing grid 54 to cut-off and close gate tube 46.

The net of the operation above described is that interlock lead 40 is twice employed during a sequence of twelve pulses to reverse, in response to a positive output pulse from stage 12, the conductive state of stage 10 as established by the input pulse which initiated the reversing output pulse, namely the fourth and ninth input pulses. Interlock lead 70 was employed once, subsequent to the first reversal of stage 10 through lead 40, in response to the fourth input pulse and prior to the second reversal of stage 10 in response to the ninth input pulse, for reversal of stage 11 by the seventh input pulse. The effect of the two interlocks is such that the circuit functions, when actuated by input pulses of equally timed intervals, to produce a first pulse in known time delayed relation to a time base comprising the first applied input pulse and a second pulse at a fixed time interval therefrom. These two pulses comprise a timed duty cycle in respect to a time base.

As shown at 80, a reset pulse, indicated at 81, may be applied to the system for the purpose of resetting the four stages to the initial state of right hand conduction, it being obvious that the positive reset pulse when applied drives all right grids of the double tubes positive to intiate conduction in the right sides, to be maintained until application of input pulses in the manner above described. Tube 46 is illustrated in Fig. 1 as being of the double control grid type commonly employed in gating circuits, the lower control grid 86 functioning as a signal input grid maintained at a proper negative potential from a source, indicated at —EG1. Positive input pulses may be applied through condenser 90 to effect negative peaked output pulses from capacitor 92 when the tube is in a gate open condition, during periods as above described with grid 54 maintained below cut-off. With grid 54 biassed below cut-off, input pulses applied to capacitor 90 does not cause tube 46 to conduct and consequently does not result in any output pulses at capacitor 92.

The device above described, unlike conventional decade counters, finds many uses as an interval timer, and particularly as an interval timer adapted to define a time interval which starts in time delayed relation to an actuating pulse and terminates at a predetermined time thereafter.

As shown in Fig. 1, the first or input stage 10 of the circuit shown may be fed by a sequence of actuating pulses indicated at 26, as for example, from an oscillator-pulser of a type delivering an output of repetitive pulses accurately spaced in respect to a time interval therebetween. As will be shown, the multiple uses for which the device is adapted contemplates a predetermined correlation between the total number of cascaded stages, the interlocking arrangement between the different stages, and the magnitude of the time interval between the actuating pulses fed to the circuit. Oscillator-pulsers as well as pulsers of other types are well known in the art, hence will not be described. It will be understood, however, that while the timer is operative in response to a sequence of input pulses and, therefore, in a sense, the circuit may be considered as counting a number of input pulses, the function of the circuit is not simply to deliver an output pulse representative of the arithmetic sum of a plurality of input pulses, a result which is obtained by scale-down counters, but rather is to produce a signal, representative of a time interval as measured by plural input pulses, after receipt of an initial actuating input pulse with a second output signal at a predetermined measured interval in respect to the first signal.

For example, the device is particularly adapted to perform, among others, the following functions:

(1) To automatically indicate two successive time intervals, $t_1$ and $t_2$, provided the ratio $t_1:t_2$ is a rational number; i. e.

$$\frac{t_1}{t_2} = \frac{n}{m}$$

where $n$ and $m$ are positive integers.

(2) To automatically time an interval $t_2-t_1$, provided $t_2:t_1$ is a rational number.

(3) To provide square-wave excitation of an electronic or electro-mechanical actuator such as a gate or relay with the edges of a square-wave indicative of a time ratio or duty cycle, provided the duty cycle can be represented as a rational number.

The selection of stage-pairs to be interlocked, in respect to the frequency of the oscillator-pulser to be employed is determined for each specific application within the capability of the device, by the algorism described below.

While not shown in Fig. 1, the above described interlocking couplings may be controlled, through multi-position switches to be switched at will between various stages to provide a convenient means for changing the time interval ratio, or duty cycle of the device for universal use in association with a sequence of actuating pulses of various time intervals therebetween as desired, for example, in the laboratory. The parameters to be determined for each application of the device are the oscillator frequency $f$; the number of interlocking connections $n$; and the pairs of stages interlocked by each connection $P_{nk}$. These parameters are specified by the algorism as shown by the following examples.

*Example 1.*—Required to energize a relay coil cyclically, with the coil energized for four consecutive seconds and de-energized during the fifth second.

*Procedure.*—(*a*) The ratio of the two intervals is $$\frac{t_1}{t_2} = \frac{4}{1}$$

Since the greatest common factor of 4 and 1 is 1, this specifies the frequency of the oscillator-pulser as 1 cps.

(*b*) Since $4=2^2$, three cascaded stages are required for the first interval.

(c) To specify interlocking paths for the second interval, perform binary subtraction of $$4-1 \text{ or } \begin{array}{r} 001 \\ -100 \\ \hline 110 \end{array}$$

This specifies interlock coupling $P_{3,1}$ and $P_{3,2}$. Such a relay, as illustrated in Fig. 2, a three stage relay, with interlocks between both the third and second and third and first stages is productive of a square wave output pulse of four second duration with one second spaces. Such a device may be utilized as an automatic keyer for automatic international alarm type transmission equipment.

A three stage relay, with interlocks as above described is illustrated in block diagram, Fig. 3.

The inventive concept above taught has also been advantageously employed in timing relays in automatic alarm systems of the type shown and described in my copending application entitled "Signal Selector Device" Serial No. 254,121 filed simultaneously herewith. The problem presented in respect to the timing relays employed therein included, for example, the provision of a timing device to deliver an output gate opening pulse 3½ seconds after initiation of relay operation by a received signal dash, and deliver a gate closing pulse exactly 2½ seconds thereafter. The problem and the solution thereof are shown below as Example 2.

*Example 2.*—Required to open a gate 3.5 seconds after an arbitrary time taken as zero, to maintain the gate open during the 2.5 seconds after opening and then close it.

*Procedure.*—To set up the device for successive intervals of 3.5 and 2.5 seconds.

(a)

$$\frac{t_2}{t_1} = \frac{3.5}{2.5} = \frac{7}{5}$$

The greatest common factor of $t_1$ and $t_2$ is ½. This specifies the oscillator-pulser frequence as 2 cps.

(b) Since $2^2$ 7 $2^3$, four cascaded stages are required and the output signal is obtained from the fourth stage.

(c) Perform binary subtraction $$8-7 \text{ or } \begin{array}{r} 0001 \\ -1110 \\ \hline 1000 \end{array}$$

This specifies $P_{3,1}$ as an interlock.

(d) Perform binary subtraction $$7-5 \text{ or } \begin{array}{r} 1110 \\ -1010 \\ \hline 0100 \end{array}$$

This specifies $P_{4,2}$ as another interlock. Thus the number of stages are chosen, and the interlocks are connected as in the Fig. 1 embodiment of the invention above described.

The circuit of Fig. 1, above described in detail, when actuated by a source of pulses spaced at one-half second intervals is productive of the results desired in Example 2 above.

What is claimed is:

1. In an electronic timing relay device adapted for actuation by a sequence of timing pulses to produce square wave output signals indicative of a measured time delayed interval following initiation of said device, the combination with a group of stages, each stage comprising a bi-stable circuit adapted to be triggered from one to the other of two stable conditions by an input pulse, and circuit means connecting said stages in cascade for transmission of output triggering pulses from one to the other of said stages for binary counter action therebetween; of circuit means interlocking one of said stages to a non-contiguous preceding stage for reversal of the stable condition of said preceding stage in response to an ouput signal from said one interlocked stage, and circuit means interlocking the last one of said stages to another non-contiguous preceding stage for reversal, in response to an output signal from said last stage of the stable condition of the previous stage interlocked therewith, and means associated with the first mentioned of said interlocked stages to effect the rise of a square wave pulse in response to an output signal from said first mentioned interlocked stage, and to effect the fall of a square wave pulse in response to an output signal from said last stage.

2. In a timing device, a group of stages, each comprising a trigger circuit having two stable conditions between which the circuit alternates in response to introduced electrical impulses, means connecting said stages in series for normal operation in the binary base notation and including means whereby each stage except the highest in series, on changing one of its stable conditions in response to an impulse transmits an operating impulse to the next highest stage in the series, means for applying operating impulses to the lower stage in the series, means including a circuit interconnecting a higher stage in the series to a non-contiguous lower stage for effecting, only upon occurrence of a change in the higher stage, from one to the other stable condition, a reversal of normal binary operation of said lower stage and permitting the normal binary operation during the other stable condition to thereby convert operation from the normal binary to another base notation, and a second circuit interconnecting another higher stage in the series to another non-contiguous lower stage for preventing, only upon occurrence of a change from one chosen stable condition, a normal binary operation of said lower stage while permitting a like operation during the other stable condition for conversion of operation from the normal binary state to another base notation.

3. In an electronic timing relay, a source of timing pulses, a group of stages each comprising a trigger circuit having two stable conditions between which it alternates in response to electrical impulses, means series connecting said stages for transmission therebetween, upon change of a lower stage from one to the other of its stable conditions, an impulse to the contiguous higher stage, means for introducing said timing pulses to the lower stage in the series, means connecting the higher stage in the series to a non-contiguous lower stage in the series for reversal of condition of said lower stage in response to an output impulse from said higher stage, and means connecting a stage intermediate said first mentioned interconnected stages to a lower stage for transmission of output signals from said intermediate stage resulting from the triggering thereof from one to the other of its stable conditions back to said lower stage for reversal thereof from one to the other of its stable conditions.

4. An interval timer having in combination a plurality of bi-stable circuits cascade coupled for transmission of actuating pulses therebetween, means associated with the first of said cascade coupled circuits for repetitive actuation thereof between its bi-stable states by a sequence of pulses spaced at equal time intervals, circuit control means associated with the last of said bi-stable circuits and adapted to be actuated between two circuit controlling states in response to output pulses from said last bi-stable circuit resulting from a change from one to the other of its bi-stable states, and means interlocking one of said bi-stable circuits other than the first or last of said circuits with the first of said circuits for reversal of the input pulse initiated stable condition of said first circuit in response to an output pulse resulting from a change of state of said bi-stable circuit interlocked therewith.

5. The device of claim 4 including interlocking means between said last bi-stable circuit and a preceeding circuit disposed intermediate said first mentioned interlocking circuits whereby said last mentioned circuit is reversed in respect to the stable condition thereof in response to an output pulse initiated by said last circuit in response to a change of state of said last circuit.

6. An electronic timing device having in combination means for initiation of evenly spaced timing pulses, a sequence of three stages each comprising circuits having three stable conditions, means cascade connecting said stages for binary action therebetween, means connecting said pulse initiating means to the first stage of said sequence for actuation from one to the other stable condition in response to each input pulse, means interlocking the third last stage of said sequence to said first stage for reversal of the stable condition of said first stage in response to a reversal of said third stage from one to the other of its stable conditions, and means interlocking said third stage with the second stage of said sequence for reversal of condition of said second stage in response to a change of said third stage to the other of its stable conditions.

7. The device of claim 6 including a gating circuit adapted to be swung to a gate-open position in response to an output signal from said last stage initiated by the first change thereof from one to the other of its stable conditions and to be swung to a gate-closed position in response to the output signal from said third stage resulting from the return thereof to the other stable condition.

8. An interval timer including four stages each comprising a bi-stable circuit, means cascade connecting the first three of said stages for normal binary operation of said third stage in response to a sequence of four input pulses introduced to the first of said stages, means interlocking the third stage to said first stage for reversal of the bi-stable condition thereof as established by said fourth applied input pulse in response to an output pulse from said third stage initiated by a reversal of the bi-stable condition thereof by a fourth input pulse, means connecting said third and fourth stages for binary action therebetween in response to a subsequent output pulse from said third stage resulting from a return thereof to the bi-stable condition initiated prior to reversal thereof by said fourth pulse, and means interlocking said fourth and second stages for reversal of the bi-stable condition of said second stage in response to a seventh input pulse applied to said first stage.

9. The device of claim 7 including circuit control means operable between open and closed positions, means connecting said circuit control means to said fourth stage for actuation thereof to one circuit controlling position in response to an output pulse from said fourth stage responsive to the seventh applied input pulse, and for actuation to the other circuit controlling position by an output pulse from said fourth stage responsive to the twelfth applied input pulse.

10. In an electronic timing device adapted for actuation by a sequence of timing pulses to produce output signals indicative of a measured interval, time delayed in respect to initiation of said device by the first of said timing pulses, the combination with a group of stages, each stage comprising a bi-stable circuit adapted to be triggered from one to the other of two stable conditions by an input pulse, and circuit means connecting said stages in cascade for transmission of output triggering pulses from one to the other of said stages for binary action therebetween; of circuit means interlocking one of said stages to a preceding stage for reversal of the stable condition of said preceding stage in response to an output signal from said one interlocked stage, circuit means interlocking another of said stages to a preceding stage for reversal, in response to an output signal from said other interlocked stage of the stable condition of the stage interlocked therewith, means associated with the first mentioned of said interlocked stages and responsive to the actuation thereof for initiation of a first output signal, and means associated with said second mentioned interlocked stage and responsive to actuation thereof for initiation of a second output signal.

11. An interval timer including a sequence of three stages each comprising a bi-stable circuit, means cascade connecting said stages for binary action therebetween, means for the initiation of evenly timed input pulses, means connecting said input pulse means to the first stage of said sequence for actuation thereof by input pulses, circuit control means operable between two circuit controlling positions, means connecting the third stage of said sequence to said circuit controlling means for actuation thereof to one circuit controlling position in response to an output pulse resulting from the switching of said third stage from one to the other bi-stable state, and to the other circuit controlling position in response to switching of said third stage to the other bi-stable state, means interlocking said third stage to said first stage for reversal of said first stage in response to a reversal of said third stage, and additional interlocking means connecting said third stage to said second stage.

References Cited in the file of this patent

UNITED STATES PATENTS

| Number | Name | Date |
|---|---|---|
| 2,306,386 | Hollywood | Dec. 29, 1942 |
| 2,410,156 | Flory | Oct. 29, 1946 |
| 2,536,035 | Cleeton | Jan. 2, 1951 |
| 2,538,122 | Potter | Jan. 16, 1951 |

OTHER REFERENCES

"Electronic Counters," by Grosdoff, pages 437–447 of RCA Review, September 1946, vol. VII, No. 3.

"Predetermined Counter for Process Control," by Blume, from February 1948 Electronics, pages 88 to 93.